Feb. 11, 1947.　　　J. B. BLACK ET AL　　　2,415,670
AERODYNAMIC BRAKE
Filed May 16, 1944　　　5 Sheets-Sheet 1

Inventors:
James B. Black
Wilbur F. Shurts
By john w Darley
Attorney

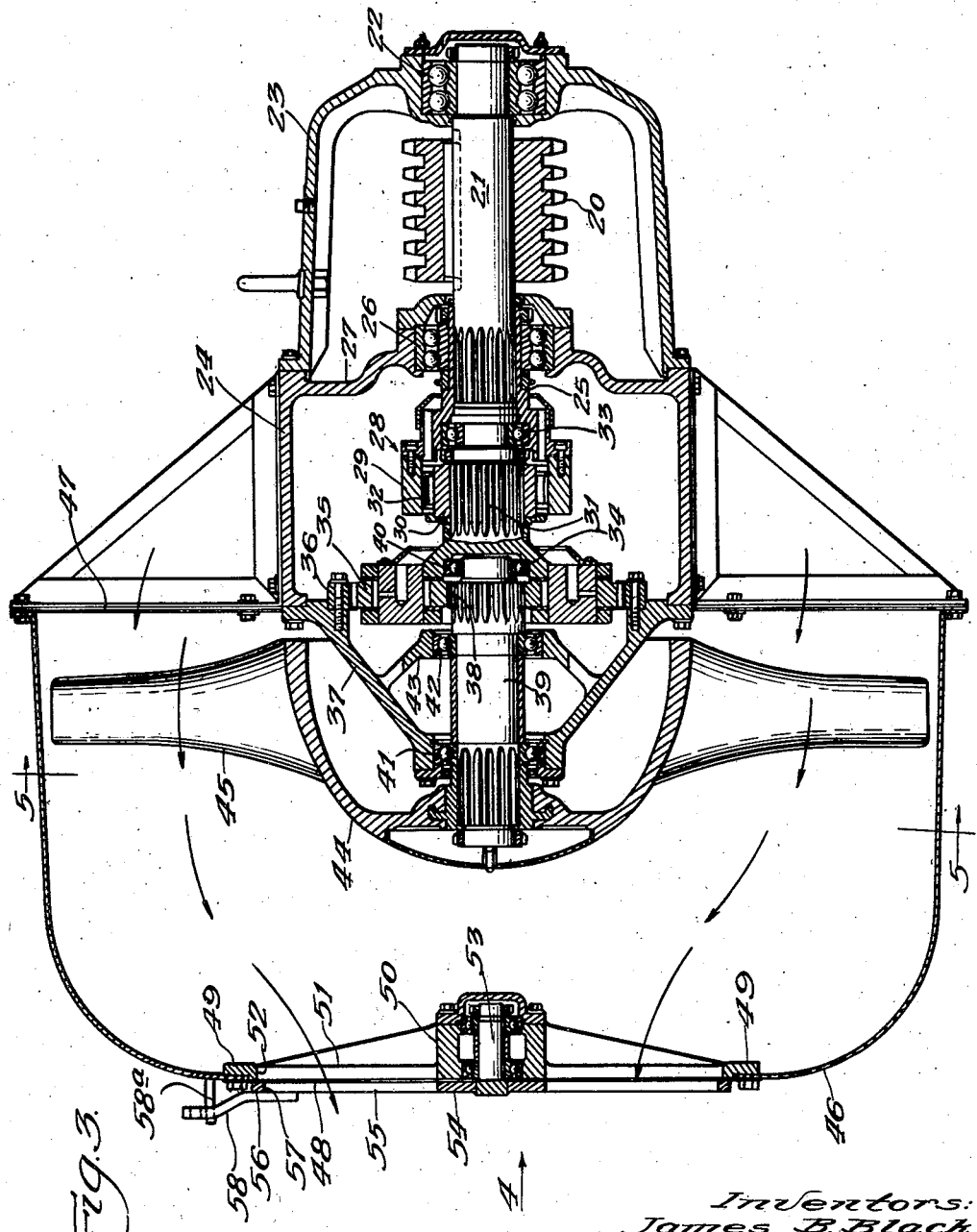

Feb. 11, 1947. J. B. BLACK ET AL 2,415,670
AERODYNAMIC BRAKE
Filed May 16, 1944 5 Sheets-Sheet 3
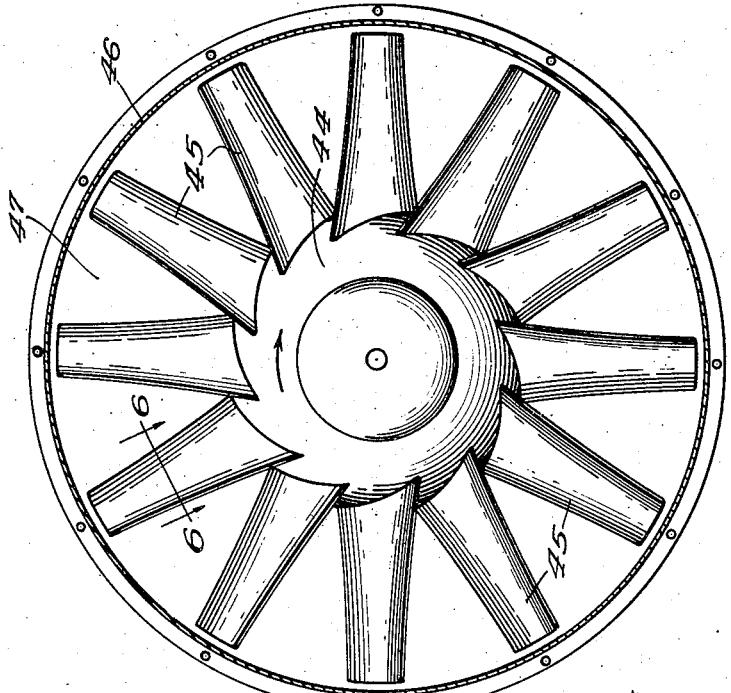
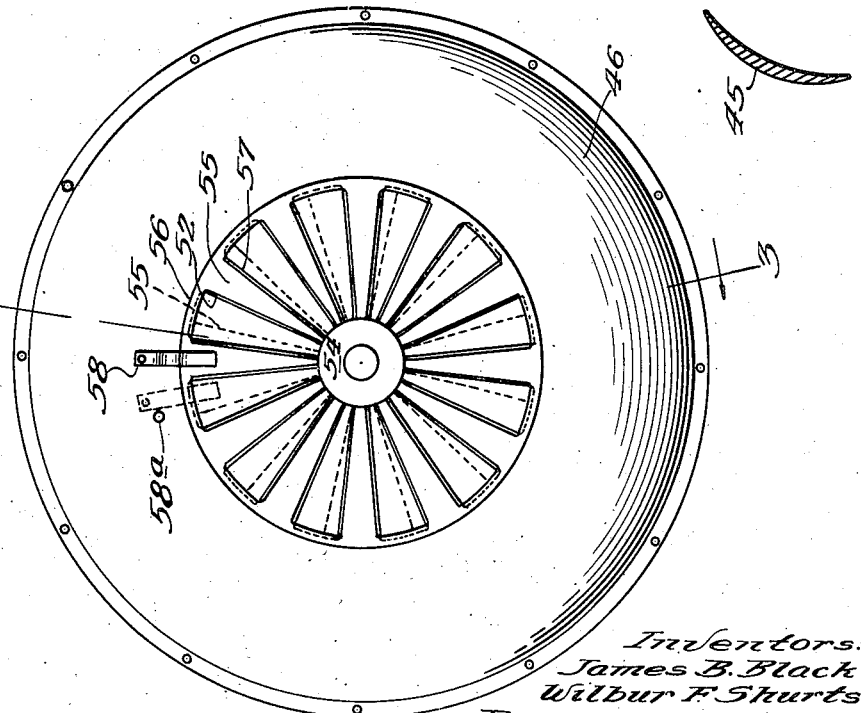
Inventors:
James B. Black
Wilbur F. Shurts
By:
John W. Darley
Attorney.

Feb. 11, 1947.  J. B. BLACK ET AL  2,415,670
AERODYNAMIC BRAKE
Filed May 16, 1944   5 Sheets-Sheet 4
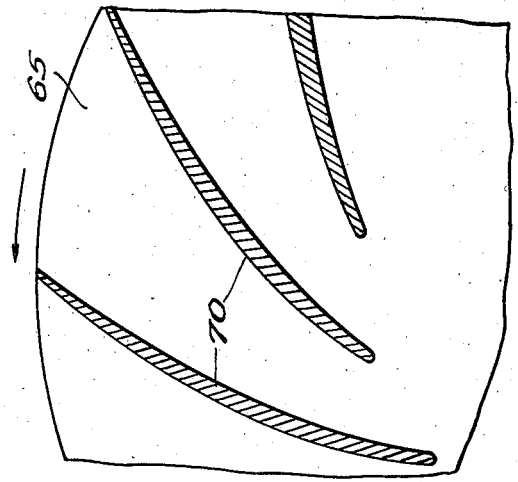
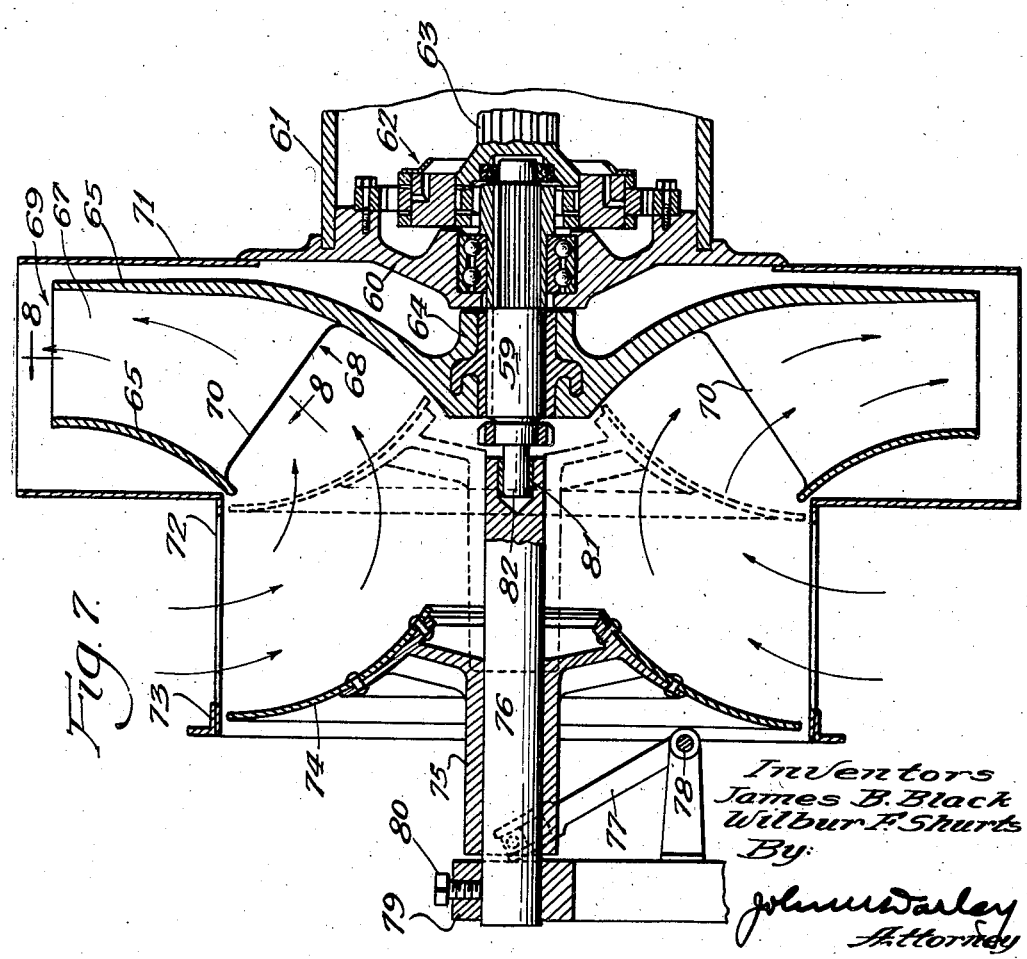
Inventors
James B. Black
Wilbur F. Shurts
By:
John W. Darley
Attorney

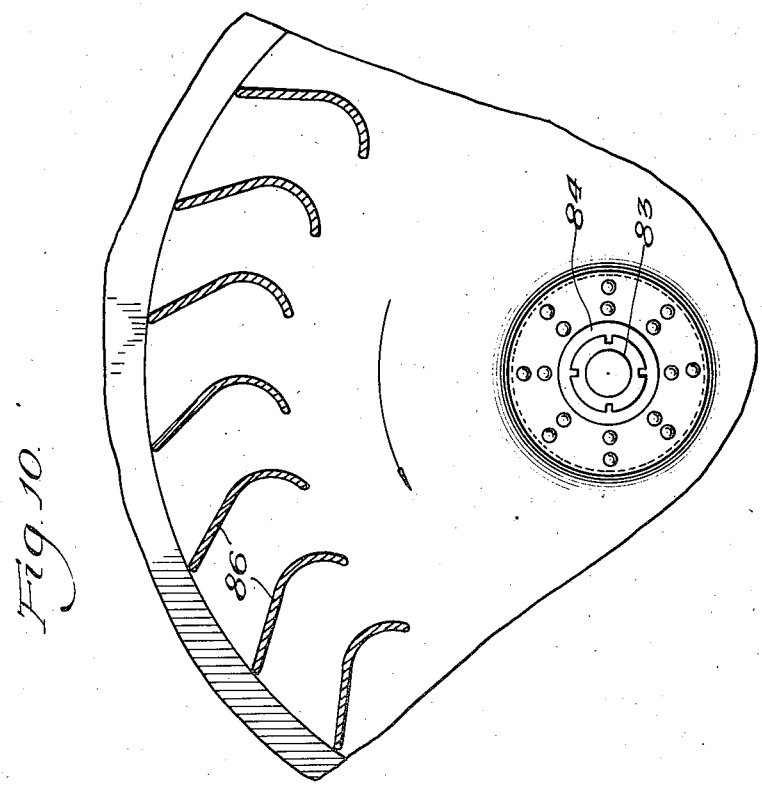
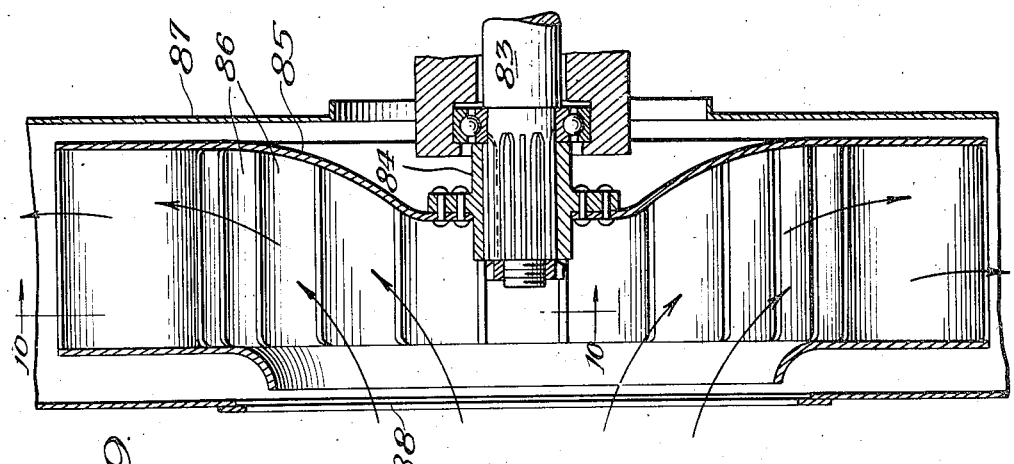

Patented Feb. 11, 1947

2,415,670

UNITED STATES PATENT OFFICE 2,415,670

AERODYNAMIC BRAKE

James B. Black and Wilbur F. Shurts, Rockford, Ill., assignors to Twin Disc Clutch Company, Racine, Wis., a corporation of Wisconsin Application May 16, 1944, Serial No. 535,839

7 Claims. (Cl. 188—90)

Our invention relates to brakes for adjustably and automatically controlling the speed of a descending load, as in oil well rigs and comparable hoists, and is more particularly concerned with providing an aerodynamic brake in which braking resistance is developed by the operation of an air fan coupled to the load.

By way of example, the invention will be described in connection with oil well drilling equipment, although in its generic aspects, it is applicable to any type of hoist and is characteristically employable under conditions in which the load is dropped at high speeds for several thousand feet. In the drilling of an oil well, the initial load may comprise sections of well casing, drilling tools of various types, or apparatus for bailing the well, and to these items must be added, as a constant load increment, the weight of the descending cable.

Previous methods for controlling the descending speed of such loads have included the use of mechanical friction brakes, or the so-called hydrodynamic brakes. The space available and the necessity for portability in equipment of this nature imposes a size limitation on the friction brake which renders it unsuitable for deep drilling operations, i. e., five thousand feet or more, since the brake must be applied continuously during descent of the load and the ensuing wear and heat, in the size of brake that can be employed, results in excessive maintenance and repair costs. On the other hand, the hydrodynamic brake, while satisfactory for deep drilling, has developed its own problems. These brakes take the form of a hydraulic coupling in which one bladed member is held stationary and the other bladed member is mounted for rotation and is connected to the load, so that the brake operates as a hydraulic coupling with 100% slip and the energy created by the descend-load is absorbed by liquid friction within the brake.

This friction develops heat and it is therefore necessary to connect a cooling system to the brake for dissipating the heat, unless the working liquid is wasted which is ordinarily impracticable, and to provide a separate pump for circulating the liquid through the cooling system or to incorporate a pumping device with the brake rotor. Moreover, the use of liquid as the braking medium necessitates the adoption of carefully designed and expensive packing to prevent leakage. These objections are reflected in a relatively high initial cost of the unit, additional repair parts, and the requirement for space to accommodate the cooling system.

It is therefore the principal object of our invention to provide a brake system for controlling the speed of a descending load in which braking resistance is secured aerodynamically by the pumping action of an air fan that is rotated by the moving load.

A further object is to devise an aerodynamic brake of the character indicated wherein torque control of the brake is effected by regulating the volume of air delivered by the fan through throttling the inlet to or the outlet from the fan casing.

A further object is to provide a fan brake system in which the braking resistance may be increased as the weight of the load increases during lowering to achieve a substantially constant speed of the load regardless of the distance through which it is lowered.

These and further objects of our invention will be set forth in the following specification, reference being had to the accompanying drawings, and the novel means by which said objects are effectuated will be definitely pointed out in the claims.

In the drawings:

Fig. 3 is an enlarged, sectional elevation of the brake, as viewed in Fig. 1, and as taken along the line 3—3 in Fig. 4.

Fig. 4 is an end view of the brake looking in the direction of the arrow 4 in Fig. 3 and showing the throttle mechanism in maximum output position.

Fig. 5 is a section along the line 5—5 in Fig. 3.

Fig. 6 is a section of one of the fan blades along the line 6—6 in Fig. 5.

Fig. 7 is a sectional elevation of a centrifugal type of fan having a throttle for controlling the admission of air to the fan.

Fig. 8 is a fragmentary section through the blades of the fan taken along the line 8—8 in Fig. 7.

Fig. 9 is a sectional elevation of a modified type of centrifugal fan.

Fig. 10 is a fragmentary section along the line 10—10 in Fig. 9 showing modified blade forms.

Figure 1:
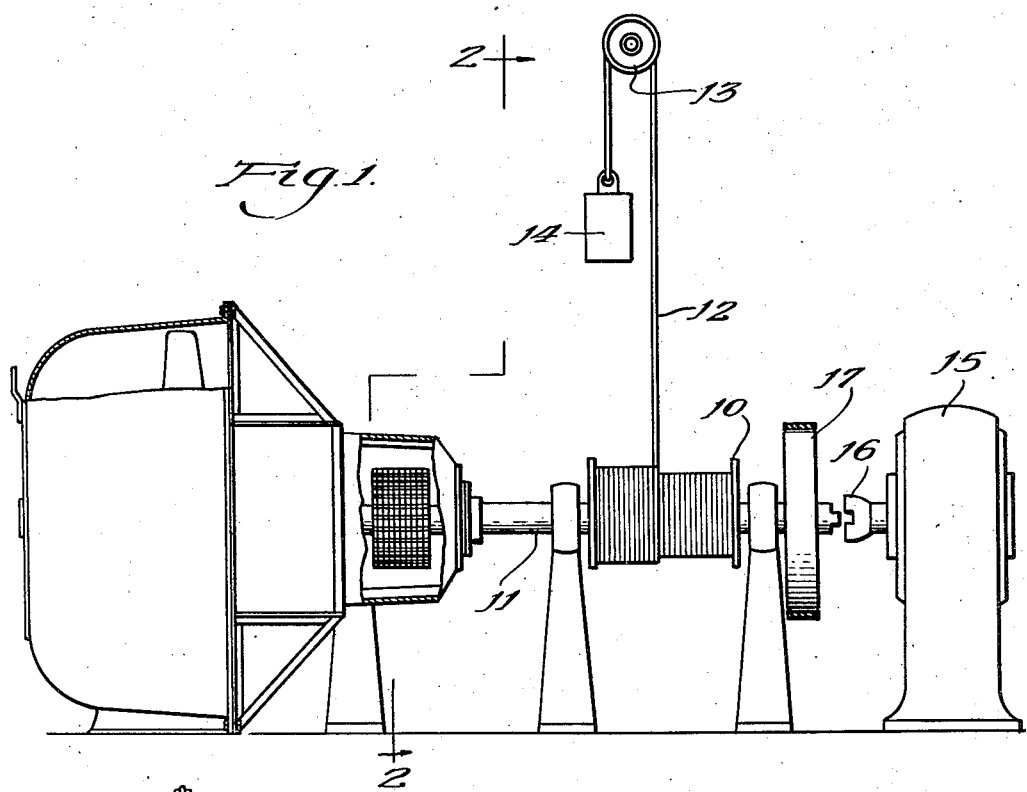
Fig. 1 is a diagrammatic view of a typical hoist rig equipped with one form of our improved aerodynamic brake which incorporates a propeller type fan having means for throttling the fan outlet to vary the air flow and hence the braking resistance of the fan.
Figure 2:
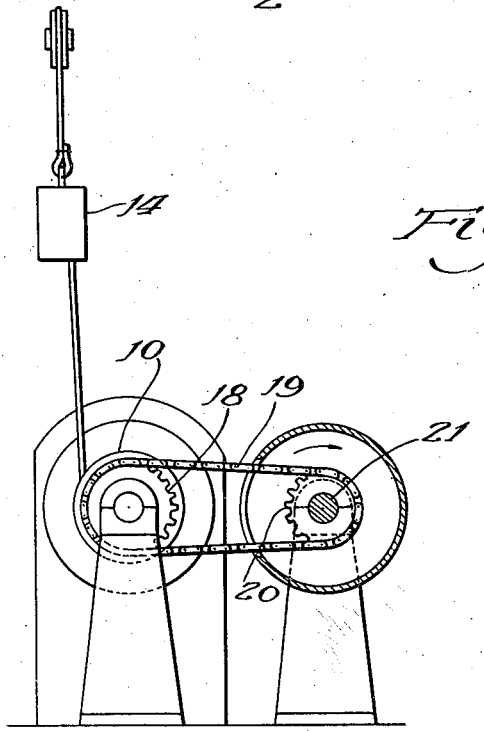
Fig. 2 is a section along the line 2—2 in Fig. 1.

Referring to Figs. 1 and 2, the numeral 10 designates a winding drum or reel that is mounted on a shaft 11 and around which is wound a cable 12 that operates over a pulley 13 and is connected to a suspended load 14. This arrangement provides a means for raising or lowering the load and is intended to be generically representative of any rig for accomplishing these results in a comparable manner. The load may be raised by a motor or prime mover 15 that may be coupled to one end of the shaft 11 by a clutch 16 and may be held in any desired raised or lowered position by means of a friction brake 17 operably related to the shaft 11.

To lower the load, the clutch 16 is disconnected and the load then falls under the action of gravity. It is desirable to control the speed of the descending load and this result is automatically attained by absorbing through the operation of the aerodynamic brake the power generated by the falling load. Generally speaking, the speed of the load increases until the energy absorbed by the brake equals the kinetic energy developed by the load and thereafter acceleration of the load ceases and it falls at a constant speed. In this connection, our improved brake is characterized by a notable advantage, particularly with respect to the hydrodynamic brake, in that by throttling the air inlet or outlet of the fan, it will control the maximum speed of the load. When the load has dropped the desired distance, it is brought to rest and held by the friction brake 17, an operation that can be effected within a few turns of the drum 10 and with a minimum of wear of the brake 17, since the latter need only overcome the inertia of the load plus the inertia represented by the weight of the suspended cable 12.

To accomplish the foregoing control, the end of the shaft 11 opposite to the clutch 16 has secured thereto a sprocket 18 which is connected by a chain 19 with a sprocket 20 keyed to an offset shaft 21 (see Figs. 1, 2 and 3) that constitutes the driving shaft of the aerodynamic brake which is more particularly illustrated in Fig. 3. The outer end of the shaft 21 is journaled in a bearing 22 carried by a casing 23 that partially encloses the sprocket 20 and is bolted to a gear housing 24. The inner end of the shaft 21 is splined for driving connection with a sleeve 25 that is journaled in a bearing 26 supported in an end wall 27 of the housing 24. The sleeve 25 forms part of a free wheel clutch designated generally by the numeral 28 and which includes an outer clutch race 29 secured to the sleeve 25, an inner clutch race 30 spline connected to an intermediate shaft 31, and a plurality of locking rollers 32 spaced around the annular space between and in cooperating relation to the races. The clutch 28 may be arranged internally in the well known manner and such that when the shaft 21 rotates clockwise, as viewed from the left in Fig. 3, corresponding to a dropping of the load (see Fig. 2), the clutch automatically engages and transmits the power generated by the falling load through devices presently described to the fan member of the brake, and when the shaft 21 rotates in the opposite direction, as when driven by the motor 15, the clutch 28 automatically disengages to prevent the fan from applying a drag to the motor. The clutch 28 is intended to be generally representative of any clutching means between the winding drum 10 and the fan, whether of the jaw or friction type and whether hand or automatically operated, for making and breaking the connection between the drum and the fan whenever desired.

The right end of the shaft 31, as viewed in Fig. 3, is journaled in a bearing 33 carried by the sleeve 25 and the opposite end is formed as a planet pinion carrier 34. Rotatably mounted in and around the carrier 34 is a plurality of planet pinions 35, each of which meshes with a fixed, internal ring gear 36 that is bolted to the other end wall 37 of the gear housing 24 and with a sun gear 38 whose teeth are cut in a fan shaft 39 whose right end carries a bearing 40 for journaling the left end of the carrier 34. The sun gear 38, the ring gear 36 and the coacting pinions 35 constitute a compact, planetary gear train for increasing the speed of the fan shaft 39 in relation to the shaft 21 and insuring that the fan driven by the shaft 39 will operate at a speed sufficient to exercise the desired torque control on the shaft 21 and hence on the winding drum 10.

The fan shaft 39 is journaled in a pair of spaced bearings 41 and 42 supported, respectively, by the wall 37 and a wing 43 extending from the wall and the left extremity of the shaft 39 has secured thereto a dome-shaped hub 44 from which radiate a plurality of fan blades 45, the whole constituting a propeller fan having a fixed pitch. The blades may possess the curved section shown in Fig. 6, or they may be flat or of the air foil type, and the number of blades may be varied as desired.

An important feature of the invention resides in the arrangement for varying the torque control on the shaft 21 by regulating the volume output of the fan and, in this particular modification, this result is accomplished by throttling the discharge side of the fan. The fan is enclosed by a housing 46 which may be secured in any desired manner to the gear housing 24 and which includes an annular inlet opening 47 through which the air passes freely from right to left, as viewed in Fig. 3, and an annular discharge opening 48 which is throttled to control the air flow through the fan housing. Specifically, a ring 49 is bolted to the inner surface of the housing 46 around the opening 48 and a hub 50 coaxial with the fan is connected to the ring 49 by a plurality of flat, radial strips 51 which are spaced by sector openings 52. Journaled in the hub 50 is a shaft 53 secured to a disk 54 which abuts the outer face of the hub and radiating from the disk 54 is a plurality of flat strips 55 whose outer extremities are connected by a ring 56 that is disposed closely adjacent the ring 49. The strips 55 are spaced circumferentially by sector openings 57 and an operating handle 58 is secured to the ring 56 and one of the strips 55. When the ring 56 occupies the full line position shown in Fig. 4, its strips 55 register with the strips 51 of the fixed ring 49, thus providing for maximum discharge of air through the openings 52 and 57 and therefore minimum torque control on the shaft 21 when the load is descending. By moving the handle 58 to the dotted position shown in Fig. 4, the strips 55 partially mask the openings 52, thereby providing for a minimum discharge of air and maximum torque control on the shaft 21. For any given installation, the extent of movement of the ring 56 may be varied as desired and suitable stops 58ª may be secured to the fan housing to limit the ring movements and particularly to prevent complete closing of the discharge openings which would result in overheating of the unit.

As indicated in Fig. 3, the fan is of the high speed, axial flow type in which the hub diameter is large in relation to the diameter of the blades. High efficiency is obtained by making the area of the air inlet 47 larger than that of the total areas of the sector openings 52, thereby providing a venturi-like effect in the fan housing. This construction accelerates the velocity of air through the fan, reduces slip and establishes a favorable lift-drag ratio.

Under operating conditions, when the motor 15 raises the load, the clutch 16 being engaged, the free wheel clutch 28 automatically disengages so that the fan does not rotate and the motor is free of any fan drag. When it is desired to drop the load, the clutch 16 is disengaged and the load then falls under the action of gravity and the clutch 28 automatically engages to drive the fan. The speed of the load is controlled by braking the rotation of the drum 10 through the action of the fan, or, in other words, the power generated by the falling load is absorbed or expended by the pumping action of the fan. Since the power absorbed by the fan at any given speed of the load depends generally on the volume of air pumped and the pressure head against which the air is moved, it will be obvious that torque control on the drum can be effectively exercised by varying the position of the ring 56 as the load falls. For any ring position, the load will eventually attain a constant speed and this speed, which is the maximum speed for the particular throttle ring position, can be varied by adjusting the position of the ring. Due to this capacity for varying the torque resistance, it is possible, despite the fact that the total weight being lowered constantly increases owing to the lengthening of the suspending cable, to maintain an approximately constant speed of the load, regardless of the depth through which it is dropped.

During the braking action, the fan rotates clockwise, as viewed in Fig. 5, and the air moves from right to left through the fan housing 46, as viewed in Fig. 3. The generated energy is converted to friction and all energy is dissipated by friction, the larger portion being absorbed externally of the fan by the impact of the fan blast on the surrounding atmosphere. Some heat may be generated in the fan and the fan housing due to friction and the usual fan losses, but the rise in temperature never becomes critical and does not affect the primary braking function of the fan. Different operating requirements can be satisfactorily met by varying the number and shape of the blades and the extent of throttling control.

In Figs. 7 and 8 is illustrated a centrifugal type of fan which can be substituted as a braking agent for the propeller fan in the hoist rig shown in Fig. 1 and which also incorporates a throttle arrangement for controlling the output of the fan. In the former figures, the numeral 59 designates a fan shaft whose right end may be journaled in a wall 60 forming part of a gear housing 61 corresponding to the housing 24 in Fig. 3 and also as in the latter figure, the shaft 59 would be driven through a planetary gear train 62 by a shaft 63 which would be connected by a free wheel or other type of clutch (not shown) with the shaft 21.

A fan hub 64 is keyed to the shaft 59 and extending annularly therefrom is a wall 65 which defines in conjunction with an axially spaced, annular wall 66 of less radial width an annular air duct 67 having an annular inlet 68 and an annular outlet 69. Bridged between the walls 65 and 66 is a plurality of fan blades 70 which may be spaced and angularly related as illustrated in Fig. 8. Instead of the air foil shape as shown, the blades may be otherwise shaped as desired. The hub 64, walls 65 and 66, and blades 70 constitute a centrifugal fan which, when rotated counterclockwise as indicated in Fig. 8, will set up a flow of air between the blades that will be discharged through the outlet 69. The fan operates within an annular housing 71 whose outer periphery is open to the atmosphere and to which the gear housing 61 may be bolted. The inlet to the fan housing takes the form of an annular opening 72 provided in a continuous wall 73 that is coaxial with the fan axis, one end of the opening being located adjacent the inner end of the wall 66.

Flow control on the air passing through the inlet 72 and hence on the amount of resistance offered by the fan to the rotation of the shaft 21 under the gravity impulse of the load 14 is effected by an annular throttle plate 74 that may be curved to direct the entering air into the fan duct 67. The plate is carried by a sleeve 75 that is slidable along a guide 76 and shifted by a yoke 77, only one arm of which is illustrated in Fig. 7, that is rocked by a suitably operated shaft 78. The guide 76 is carried at one end in a support 79 and held against rotation by a set screw 80 while the opposite end may be recessed as at 81 to receive the reduced end 82 of the fan shaft 59.

The operating characteristics of the centrifugal fan and its manner of use are similar to those heretofore described in connection with the propeller fan. When the load is raised by the motor 15, the free wheel clutch 28 automatically disengages and breaks driving connection to the fan, thus eliminating drag of the latter on the motor. When the load is dropped, its speed may be controlled by means of the throttle plate 74. During the initial period of fall and in order to accelerate the load rapidly, the plate 74 may occupy the dotted position shown in Fig. 7 in which it substantially prevents the flow of air to the fan duct 67 so that the load may drop relatively free of restraint by the fan. Braking is accomplished by shifting the plate 74 towards the full line position in Fig. 7 in which maximum resistance is generated by the fan, with intermediate positions providing varying degrees of resistance, so that the load may be held to a substantially constant speed and the maximum value of the speed may be controlled.

In Figs. 9 and 10 is illustrated a still further modification of the aerodynamic brake which includes a centrifugal fan without throttle control. The fan shaft 83 is suitably journaled and driven as indicated in Fig. 3, including the use of a free wheel clutch 28, and has keyed thereto a fan hub 84 to which is secured a centrifugal fan 85 of characteristic construction having blades 86 which may be hook-shaped and relatively positioned as indicated in Fig. 10. In order to provide better control on the air movement, the fan 85 rotates in a housing 87 having an inlet opening 88 coaxial with the fan and the air pumped by the fan is discharged radially of the housing to the atmosphere.

The fan shown in Fig. 9 has the same general operating characteristics as that illustrated in Fig. 7, except that it lacks any facility for varying the braking resistance to the falling load. The shaping of the blades provides for the maximum absorption of torque when the fan rotates counterclockwise, as indicated in Fig. 10, and the lowest possible drag torque when rotated in the opposite direction where a clutch is not interposed between the fan and winding drum. The load accelerates until the power generated thereby is absorbed by the fan and thereafter falls at a constant speed.

Since most of the energy absorption is dissipated directly in the atmosphere with any of the above brake types, cooling does not present a problem. It is unnecessary to provide extraneous cooling equipment as in those kinds of apparatus which employ liquid as the braking medium. Moreover, by using a free wheel clutch between the fan and load, power connection therebetween is automatically interrupted when the load is raised thus eliminating fan drag on the motor. Power connection to the fan may also be manually controlled by an appropriate clutch.

We claim:

1. In a brake system for hoists, the combination of a shaft rotatable by a falling load and whose rotation is to be braked, an air fan driven by the shaft, a housing enclosing the fan having inlet and discharge openings communicating with the atmosphere, and throttle plates each having a plurality of spaced apertures registering with one of the housing openings and relatively movable in a plane transverse to the fan axis to regulate the amount of air flow through the apertures for varying the aerodynamic resistance of the fan to the rotation of the shaft.

2. In a brake system for hoists, the combination of a shaft rotatable by a falling load and whose rotation is to be braked, an air fan driven by the shaft, a housing enclosing the fan having inlet and discharge openings communicating with the atmosphere, a fixed throttle plate having a plurality of spaced apertures registering with one of the housing openings, and a movable throttle plate in coacting relation to the fixed plate and adjustable in a plane transverse to the fan axis to regulate the amount of air flow through the fixed plate for varying the aerodynamic resistance of the fan to the rotation of the shaft.

3. In a brake system for hoists, the combination of a shaft rotatable by a falling load and whose rotation is to be braked, a propeller air fan driven by the shaft, a housing enclosing the fan having inlet and discharge openings communicating with the atmosphere, and throttle plates each having a plurality of spaced apertures registering with one of the housing openings and relatively movable in a plane transverse to the fan axis to regulate the amount of air flow through the apertures for varying the aerodynamic resistance of the fan to the rotation of the shaft.

4. In a hoist system, the combination of a shaft rotatable in one direction by a falling load, power means for rotating the shaft in the opposite direction to raise the load, a clutch for connecting the means to the shaft, an independently mounted, air fan for aerodynamically resisting the rotation of the shaft under the impulse of the falling load when the clutch is disconnected, and a second clutch between the fan and shaft adapted to automatically make and break connection therebetween, respectively, when the load is falling and is being raised to eliminate fan drag on the power means, the fan and shaft being coaxial.

5. In a hoist system, the combination of a shaft rotatable in one direction by a falling load, power means for rotating the shaft in the opposite direction to raise the load, a clutch for connecting the means to the shaft, an independently mounted, air fan for aerodynamically resisting the rotation of the shaft under the impulse of the falling load when the clutch is disconnected, and a free wheel clutch between the fan and shaft adapted to complete connection therebetween when the load is falling and to break connection when the load is raised to eliminate fan drag on the power means, the fan and shaft being coaxial.

6. In a hoist system, the combination of a shaft rotatable in one direction by a falling load, power means for rotating the shaft in the opposite direction to raise the load, a clutch for connecting the means to the shaft, an independently mounted, air fan for aerodynamically resisting the rotation of the shaft under the impulse of the falling load when the clutch is disconnected, a second clutch between the fan and shaft adapted to complete connection therebetween when the load is falling and to break connection when the load is raised to eliminate fan drag on the power means, the fan and shaft being coaxial, a housing enclosing the fan having inlet and discharge openings communicating with the atmosphere, and throttle means controlling air flow through one of the openings for varying the aerodynamic resistance of the fan to the unwinding of the drum.

7. In a hoist system, the combination of a shaft rotatable in one direction by a falling load, power means for rotating the shaft in the opposite direction to raise the load, a clutch for connecting the means to the shaft, an independently mounted, air fan for aerodynamically resisting the rotation of the shaft under the impulse of the falling load when the clutch is disconnected, a free wheel clutch between the fan and shaft adapted to automatically complete connection therebetween when the load is falling and to break connection when the load is raised to eliminate fan drag on the power means, the fan and shaft being coaxial, a housing enclosing the fan having inlet and discharge openings communicating with the atmosphere, and throttle means controlling air flow through one of the openings for varying the aerodynamic resistance of the fan to the unwinding of the shaft.

JAMES B. BLACK.
WILBUR F. SHURTS.

REFERENCES CITED

The following references are of record in the file of this patent:

UNITED STATES PATENTS

| Number | Name | Date |
|---|---|---|
| 1,350,018 | Gill | Aug. 17, 1920 |
| 56,553 | Gullmann | July 24, 1866 |
| 289,318 | Smith | Nov. 27, 1883 |
| 1,483,075 | Chilton | Feb. 12, 1924 |
| 2,014,684 | Junkers | Sept. 17, 1935 |
| 2,130,528 | Alexander | Sept. 20, 1938 |
| 2,219,215 | Anderson | Oct. 22, 1940 |

FOREIGN PATENTS

| Number | Country | Date |
|---|---|---|
| 218,859 | British | July 17, 1924 |